(12) United States Patent
Zhang et al.

(10) Patent No.: US 10,084,816 B2
(45) Date of Patent: Sep. 25, 2018

(54) PROTOCOL BASED DETECTION OF SUSPICIOUS NETWORK TRAFFIC

(71) Applicant: Fortinet, Inc., Sunnyvale, CA (US)

(72) Inventors: Jie Zhang, Burnaby (CA); He Xu, Burnaby (CA)

(73) Assignee: Fortinet, Inc., Sunnyvale, CA (US)

( * ) Notice: Subject to any disclaimer, the term of this patent is extended or adjusted under 35 U.S.C. 154(b) by 223 days.

(21) Appl. No.: 14/751,662

(22) Filed: Jun. 26, 2015

(65) Prior Publication Data

US 2016/0381070 A1  Dec. 29, 2016

(51) Int. Cl.
   *H04L 29/06* (2006.01)

(52) U.S. Cl.
   CPC ........ *H04L 63/1466* (2013.01); *H04L 63/145* (2013.01)

(58) Field of Classification Search
   None
   See application file for complete search history.

(56) References Cited

U.S. PATENT DOCUMENTS 6,971,028 B1 * 11/2005 Lyle .................. G06F 21/554
                                                       709/224
2010/0037314 A1 * 2/2010 Perdisci ............. H04L 63/1416
                                                       726/22
2010/0162350 A1 * 6/2010 Jeong ................. H04L 63/1416
                                                       726/1
2013/0117847 A1 * 5/2013 Friedman ............. H04L 63/102
                                                       726/22

OTHER PUBLICATIONS

Cho, et al. "Inference and Analysis of Formal Models of Botnet Command and Control Protocols" 14 pgs.

* cited by examiner

*Primary Examiner* — William J. Goodchild
(74) *Attorney, Agent, or Firm* — Hamilton, DeSanctis & Cha LLP

(57) ABSTRACT

Embodiments of the present invention relate to identification of suspicious network traffic indicative of a Botnet and/or an Advanced Persistent Threat (APT) based on network protocol of such traffic. According to one embodiment, a traffic file is received at a network security device that is protecting a private network. The traffic file contains therein network traffic associated with the private network that has been captured and stored. The received traffic file is processed by the network security device to determine whether the network traffic relates to a network protocol that is indicative of existence of a network security threat within the private network. When existence of the network security threat is detected, then the network security device reports details regarding the network security threat.

19 Claims, 7 Drawing Sheets

400

```
Stream Content
POST /andro/image.php HTTP/1.1
Host: e█████ft.su
User-Agent: Mozilla/4.0
Content-Type: application/x-www-form-urlencoded
Content-Length: 88
Connection: close fHGATcI3/T/unsdl3gruAj7Z87JXXFW/92X7gTuT7xx+8APIX5kyxTOJ8LzZZAN9N8vwgA2rNwSapnqvE3
+kkvgaHTTP/1.1 200 OK
Date: Thu, 13 Nov 2014 10:40:33 GMT
Server: Apache/2.2.16 (Debian)
X-Powered-By: PHP/5.3.3-7+squeeze19
Content-Length: 48
Connection: close
Content-Type: application/octet-stream HG$...fk.....3(...o.s$....x.A...o.r.....2....4j.|
```

```
Stream Content
POST / HTTP/1.1
User-Agent: Mozilla/4.0 (compatible; MSIE 6.0; Windows NT 5.1;
Host: ███████████████████
Connection: close
Content-Length: 317
Content-Type: application/x-www-form-urlencoded =...J9MZ.........................................
SW^.KVN.o.l..[o&fo./LwcT9;w;-]4.^YG/v>t.0\]!QG).w:b.[8!-"s`X.=
B.fJ,H[(..7.&
.4.:j..$rcw2K.!lun&....jk.*'d.....................
```

```
Offset(h)  00 01 02 03 04 05 06 07 08 09 0A 0B 0C 0D 0E 0F
00000000   63 6D 64 3D 67 65 74 6C 6F 61 64 26 6C 6F 67 69   cmd=getload&logi
00000010   6E 3D 36 42 33 39 46 36 41 41 34 35 37 41 43 37   n=6B39F6AA457AC7
00000020   39 36 35 44 44 32 36 33 43 43 33 36 45 42 39 35   965DD263CC36EB95
00000030   36 36 31 38 41 38 41 34 38 41 26 73 65 6C 3D 63   6618A8A48A&sel=c
00000040   6F 6F 6C 38 26 76 65 72 3D 35 2E 31 26 62 69 74   ool8&ver=5.1&bit
00000050   73 3D 30 26 61 64 6D 69 6E 3D 31 26 68 61 73 68   s=0&admin=1&hash
00000060   3D 26 72 3D 53 4C 6C 3D 62 37 28 24 5D 43 69 3C   =&r=SLl=b7($]Ci<
00000070   70 32 34 4E 71 45 79 66 59 60 5C 29 22 48 48 42   p24NqEyfY`\)"HHB
00000080   4A 63 38 2C 2C 58 63 33 37 2C 38 25 66 3D 4C 71   Jc8,,Xc37,8%f=Lq
00000090   3D 6A 46 59 21 2F 62 2C 33 2F 69 69 32 2B 3E 77   =jFY!/b,3/ii2+>w
000000A0   71 3F 49 20 58 5D 5F 5D 41 62 56 79 76 26 74 33   q?I X]_]AbVyv&t3
000000B0   51                                                Q
```

FIG. 5B

PROTOCOL BASED DETECTION OF SUSPICIOUS NETWORK TRAFFIC

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2015, Fortinet, Inc.

BACKGROUND

Field

Embodiments of the present invention generally relate to the field of network security. More particularly, embodiments of the present invention relate to identification of suspicious network traffic indicative of a Botnet and/or an Advanced Persistent Threat (APT) based on characteristics of the traffic (e.g., the protocol used, the source or destination port and/or the source or destination address).

Description of the Related Art

Existing web-based applications/solutions allow users to visit a website using a variety of web browsers, e.g., Internet Explorer, Mozilla Firefox, Google Chrome and Apple Safari, etc., that may be installed on a variety of devices, e.g., computer, laptop, mobile phones, tablets, PDAs, etc., that may run different operating systems, e.g., Windows, Mac, Unix, Linux, Android, etc. Meanwhile, each browser or operating system can have different versions.

A Web robot (also referred to as an "Internet bot" or simply a "bot") is a type of malware (malicious software) that allows an attacker to control an infected computer system. A botnet is a network of computing devices, which are typically made up of devices infected with malicious bots that may stretch across the globe. Command-and-control servers (C&C or C2 servers), on the other hand, are servers that are used by the botnet originator (referred to as a "bot herder" or "bot master") to maintain communications with the infected computing devices within a given network. The bot master typically administers and controls the infected computing devices remotely via the C2 server, which is used to send instructions to zombie computing devices, typically via Hypertext Transfer Protocol (HTTP), instant messaging (IM) protocols, peer-to-peer (P2P) and/or social networks. Once a malicious bot has infected a computer, it may gather confidential information (e.g., login credentials, credit card information, and the like) and communicate that information back to a C2 server. Bots may also propagate themselves to other computer systems within a home or enterprise network, for example, by exploiting vulnerabilities and weak passwords and can also perform other functions responsive to receipt of remote C2 server commands.

Advanced Persistent Threats (APTs) are network attacks in which an unauthorized person gains access to a network or computer system. APTs are often directed at targets including businesses and politicians. APTs are generally slow, deliberate, and secret in action or character and hence require a prolonged duration of operation in order to be successful. Both botnets and APTs have now become significant threats to personal and corporate security. As such, accurate and efficient detection of botnets and APTs is of increasing importance.

There is an ever growing volume of malware, making it challenging for Anti Virus (AV) engines to detect them within a reasonable time. Malware, at times, exhibit benign behavior so as to evade sandbox detection. Therefore, even sophisticated Intrusion Prevention Systems (IPSs) that provide security at the network level, are not able to fully detect and/or block encrypted traffic used by botnets and/or APTs.

SUMMARY

Embodiments of the present invention relate to identification of suspicious network traffic indicative of the existence of a Botnet and/or an Advanced Persistent Threat (APT). According to one embodiment, a traffic file is received at a network security device that is protecting a private network. The traffic file contains therein network traffic associated with the private network that has been captured and stored. The received traffic file is processed by the network security device to determine whether the network traffic relates to a network protocol that is indicative of existence of a network security threat within the private network. When existence of the network security threat is detected, then the network security device reports details regarding the network security threat.

Other features of embodiments of the present invention will be apparent from accompanying drawings and from detailed description that follows.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

FIG. 4 illustrates exemplary stream content processing that may be employed to detect a botnet and/or an APT in accordance with an embodiment of the present invention.

FIGS. 5A and 5B illustrate additional examples of stream content processing of network traffic to detect a botnet and/or an APT in accordance with an embodiment of the present invention.

DETAILED DESCRIPTION

Figure 1:
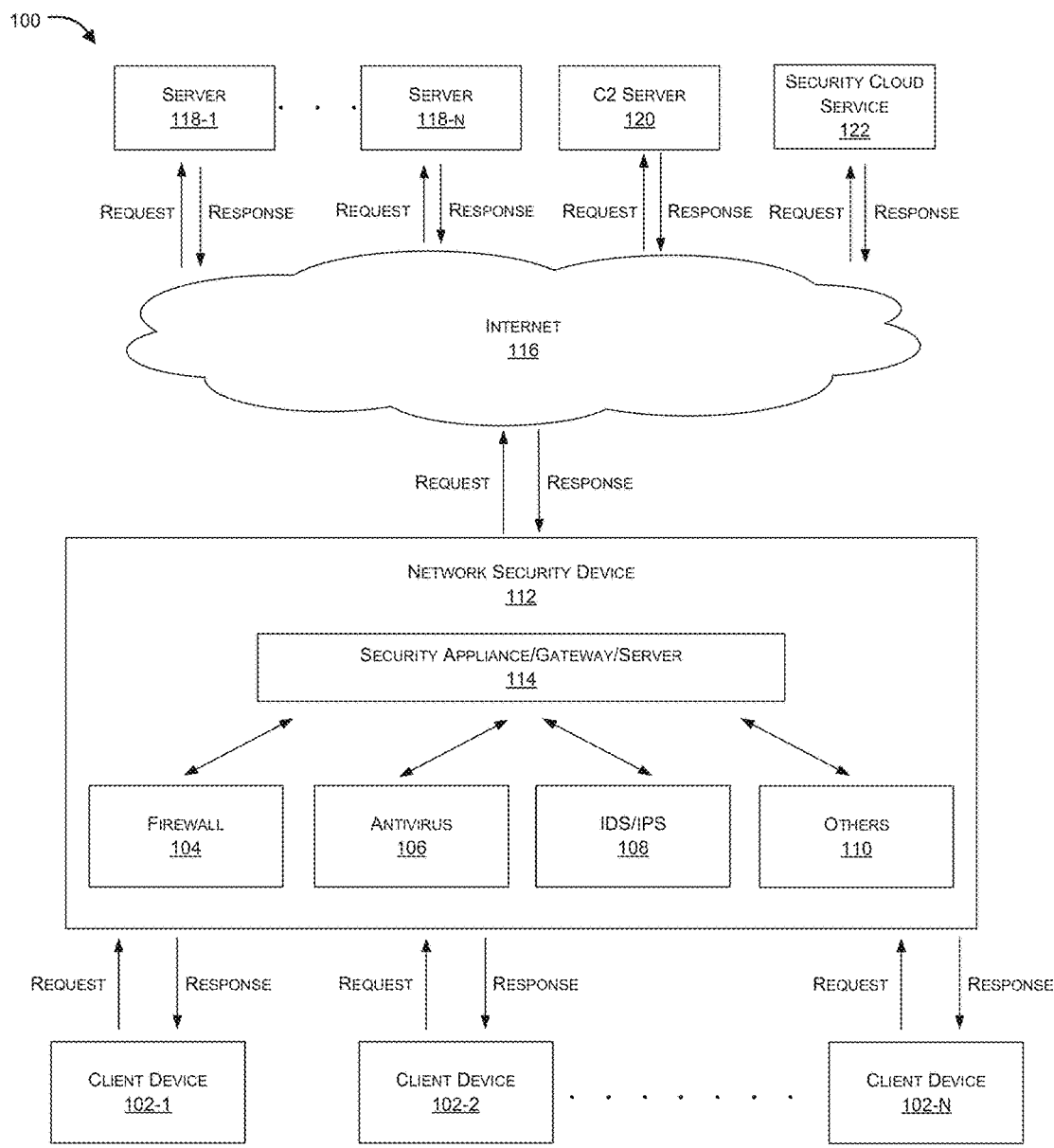
FIG. 1 illustrates an exemplary network architecture in which embodiments of the present invention can be implemented.

Methods and systems are described for accurately and efficiently detecting botnets and APTs. In the following description, numerous specific details are set forth in order to provide a thorough understanding of embodiments of the present disclosure. It will be apparent to one skilled in the art that embodiments of the present disclosure may be practiced without some of these specific details.

Embodiments of the present disclosure include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, firmware and/or by human operators.

Embodiments of the present disclosure may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present disclosure with appropriate standard computer hardware to execute the code contained therein. An apparatus for practicing various embodiments of the present disclosure may involve one or more computers (or one or more processors within a single computer) and storage systems containing or having network access to computer program(s) coded in accordance with various methods described herein, and the method steps of the disclosure could be accomplished by modules, routines, subroutines, or subparts of a computer program product.

If the specification states a component or feature "may", "can", "could", or "might" be included or have a characteristic, that particular component or feature is not required to be included or have the characteristic.

Although the present disclosure has been described with the purpose of conducting network auditing, it should be appreciated that the same has been done merely to illustrate the disclosure in an exemplary manner and any other purpose or function for which the explained structure or configuration can be used, is covered within the scope of the present disclosure.

Exemplary embodiments will now be described more fully hereinafter with reference to the accompanying drawings, in which exemplary embodiments are shown. This disclosure may, however, be embodied in many different forms and should not be construed as limited to the embodiments set forth herein. These embodiments are provided so that this disclosure will be thorough and complete and will fully convey the scope of the disclosure to those of ordinary skill in the art. Moreover, all statements herein reciting embodiments of the disclosure, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying this disclosure. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this disclosure. Those of ordinary skill in the art further understand that the exemplary hardware, software, processes, methods, and/or operating systems described herein are for illustrative purposes and, thus, are not intended to be limited in any manner or to any named element/component.

Embodiments of the present invention relate to identification of suspicious network traffic indicative of a Botnet and/or an Advanced Persistent Threat (APT) based on information or characteristics of the network protocol of such traffic. A system implementing techniques of the present disclosure can be configured to receive a traffic file containing network traffic that has been captured and saved, which traffic file can then be processed to determine if any network protocol indicative of a network security threat exists in the traffic file. When it is determined that traffic file includes one or more network protocols relating to at least one network security threat, the threat can be reported.

In an aspect, a network security system implementing techniques of the present disclosure can include a traffic file receive module that can be configured to receive a traffic file captured from network traffic. The system can further include a network traffic protocol determination module that can be configured to process the received traffic file to determine if any network protocol indicative of a network security threat exists in the traffic file. Furthermore, the system can include a malware reporting module that can be configured to report network security threat details if it is confirmed that the traffic file comprises one or more network protocols relating to at least one network security threat.

In another aspect, the detected network security threat can be a Botnet and/or an Advanced Persistent Threat (APT), and wherein network security threat details can include one or a combination of Botnet/APT name, protocol, and details of servers that the detected Botnet/APT communicate with. In yet another aspect, the malware reporting module can be configured to report the Botnet/APT details to an Intrusion Protection System (IPS) engine, which in turn, can be configured to block traffic and/or submit a uniform resource locator (URL) to a web-filter to intercept URL access.

In yet another aspect, the detected network security threat can include any or a combination of grayware/spyware/malware based threat, bitcoin miner based threat, Remote Access Tool (RAT) based threat. In another aspect, the network traffic protocol determination module can further be configured to determine encryption status of at least one part of the received traffic file, and decode the at least one part of the received traffic file to detect the network protocol that is indicative of a network security threat based on a detection rule. Such a detection rule can be configured to match the at least one part of the received traffic file with a pattern to detect the network protocol, wherein the pattern can be selected from a set comprising regular expression based pattern, string match based pattern, and script language implemented pattern. In yet another aspect, the network traffic can include any or a combination of HTTP traffic, Internet Relay Chat (IRC) traffic, and unclassified application traffic.

Aspects of the present disclosure further relate to a method that is configured to detect network security threats based on network protocol that the threats incorporate and/or are indicative of, wherein the method includes the step of receiving, at a computing device, a traffic file captured from network traffic; processing, at the computing device, the received traffic file to determine if any network protocol that is indicative of a network security threat exists in the traffic file; and reporting, at the computing device, network security threat details if it is confirmed that the traffic file comprises one or more network protocols relating to at least one network security threat.

FIG. 1 illustrates an exemplary network architecture in which embodiments of the present invention can be implemented. As shown in FIG. 1, architecture 100 can include one or more client devices such as client device 102-1, client device 102-2, ... , and client device 102-N, which may be collectively/individually and interchangeably referred to as client device(s) 102 hereinafter. Client devices 102 can be connected through a network security device 112 to Internet 116 for access to one or more resources being offered by different servers such as by server 118-1, ... , server 118-N (which may be collectively or individually referred to as server(s) 118 hereinafter), C2 server 120, and security cloud service server 122. Any other server can easily be configured in the architecture and hence is completely within the scope of the present disclosure.

As client devices 102 connect with one or more servers through Internet 116, the client devices 102 and the servers can be vulnerable to different types of cyber attacks. For instance, BOTNET/malicious executables or other malware content can be spread throughout the Internet 114 to infect client devices 102 and different servers. In order to prevent such attacks, a network security device 112 can be configured in accordance with an embodiment of the present disclosure, wherein the security device 112 can be logically interposed between client devices 102 and external servers (such as servers 118 and C2 server 120). In an implementation, network security device 112 can provide security to both, client devices 102 as well as to servers 118 by monitoring traffic passing through network security device 112. In another implementation, network security device 112 can be configured to control the incoming/outgoing traffic to/from client devices 102. In yet another implementation, a dedicated network security device 112 can be implemented between a client device 102 and a given server.

It is to be appreciated that FIG. 1 illustrates a single network security device 112 for simplicity of representation and explanation. Those skilled in the art will appreciate more than one network security device can be included within network architecture 100. In an implementation, network security device 112 can be integrated and/or be operatively coupled with one or more other security devices, including but not limited to, a firewall, a gateway, an Intrusion Detection System (IDS), an Intrusion Prevention System (IPS), a network traffic capture system, a network monitor or a sandbox framework. In another implementation, network security device 112 can work as a standalone network device to provide required security features to the network. In yet another implementation, network security device 112 can be implemented over/with any existing security appliance/gateway/server 114, wherein security appliance 114 can incorporate or be operatively coupled with a firewall 104, an antivirus engine 106 running on a general purpose computing device, an IDS/IPS 108, or any other 110 network device such as antispyware engine, content filtering engine, multilayered security monitor, a bytecode monitor, a URL monitor, among others.

Depending upon the particular implementation, network security device 112 can be configured to process network traffic that has been captured and stored to a file or network security device 112 may be configured to receive and process traffic flowing through the network in real-time. According to one embodiment, network security device 112 can be configured to receive traffic files or logs representing network traffic that has been captured and saved by a network traffic capture system, for example. The traffic files or logs may include all traffic observed within a private network (e.g., an enterprise network) or may include only a subset thereof considered to be suspicious. For example, the network traffic capture system may be configured to capture and analyze all traffic, but only to save network traffic having particular characteristics (e.g., traffic containing encrypted data, traffic carried within one or more predefined or configurable protocols, traffic originating from one or more predefined or configurable sources, traffic directed to one or more predefined or configurable destinations, traffic using one or more predefined or configurable source or destination ports and the like). In one embodiment, network security device 112 performs post processing of traffic files created by the network traffic capture system so as to avoid affecting network traffic performance within the private network. As the traffic files are post processed, network security device 112 may use various characteristics (e.g., the protocol used, a specified domain, the source or destination port and/or the source or destination address) of the traffic contained therein to identify potential infection by a malicious bot associated with a known botnet and/or an APT. For example, when a client within the private network is communicating with a C2 server that is associated with a known botnet or APT, it may reasonably be concluded that the client has been infected by the APT or is being controlled by the botnet. Various other traffic patterns known to be associated with botnets and APTs may also be used to conclude that a client within the private network has been compromised/infected. For example, if a client is attempting to contact a domain known to be associated with a botnet, it may reasonably be concluded that the client has been infected by an APT or is being controlled by the botnet. Similarly, if the network traffic protocol being used to communicate with or by a particular client is known to be used as a botnet C2 protocol or other botnet communication protocol, it may reasonably be concluded that the client has been infected by an APT or is being controlled by the botnet. As discussed further below, once network security device 112 has identified an infected client, it may perform one or more countermeasures, for example, notifying an IPS to block traffic directed to or originated by the infected client.

In implementation, network security device 112 can be configured to maintain a list of suspicious network traffic protocols that an intruder may use for performing different types of network attacks, that are used in one or more network security threats, that are used as botnet communication protocol or that are used as botnet C2 protocols. In this manner, traffic entering or leaving the private network can be processed against such a list of suspicious network traffic protocols to determine if the traffic uses any of the suspicious protocols and is therefore indicative of a network security threat (e.g., malware, malicious content, a compromised client and the like). In an implementation, the list of suspicious network traffic protocols used for different types of network security threats/attacks can be manually/automatically compiled and/or updated at regular intervals or in real-time. In an embodiment, the list of suspicious network traffic protocols can be indicative of network security threats, such as botnets or APTs.

According to one embodiment, upon receiving one or more traffic files, network security device 112 can process the traffic files to determine the network protocol(s) that were used by the traffic samples stored within the traffic files for communication over the network. In an example implementation, network security device 112 can be configured to determine the encryption status of incoming/outgoing traffic, and identify the encryption mode/technique being used so as to then apply a suitable decoding technique to decode at least one part of the received traffic file and then detect the network protocol(s) used by the traffic. Those skilled in the art will appreciate that only a part of the traffic file may need to be decoded so as to be able to just extract information relating to the network traffic protocol(s) represented within the file, based on which it can be detected whether the extracted network traffic protocol(s) are indicative of at least one network security threat.

According to one embodiment, once at least one network protocol being used by a traffic file is determined, protocol information/attributes of the network protocol can be analyzed to confirm if the protocol is indicative of or is associated with a network security threat such as a botnet or APT. Based on such determination, when a network security threat is confirmed, network security device 112 can extract details pertaining to the identified network security threat. In an implementation, network security threat details can include, but are not limited to, one or more of a type of network attack, a botnet or APT name, a network protocol being used, details of servers that the detected Botnet/APT communicates with, details of a source device from which the traffic was originated, among any other configured/desired information. In another aspect, network security threat details can include information such as type of network attack, source address, destination address, content type, and other details that may be available based on an analysis of the traffic at issue. In an example implementation, network security device 112 can report suspicious traffic files along with security threat details to one or more network devices such as firewall 104, antivirus 106, IDS/IPS 108, or to other security controlling devices/applications, which can take appropriate action on the network security threat. In an implementation, network security device 112 can be configured to report the detected traffic file and security threat details along with other details to an intrusion protection system (IPS), which can be configured to block traffic and/or submit a URL to a web-filter in order to intercept URL access if, for instance, the reported traffic file was related to a web service request.

In an example implementation, network devices such as firewall, gateways, IDS/IPS, among others can be configured to receive information (e.g., a flag or other indication) about a traffic file or a particular traffic flow from network security device 112 and take appropriate action, wherein upon receiving the information regarding the suspicious traffic file from the network security device 112, security appliances 114 can apply one or more predefined rules to block subsequent traffic to or from the compromised client, for example.

Figure 2:
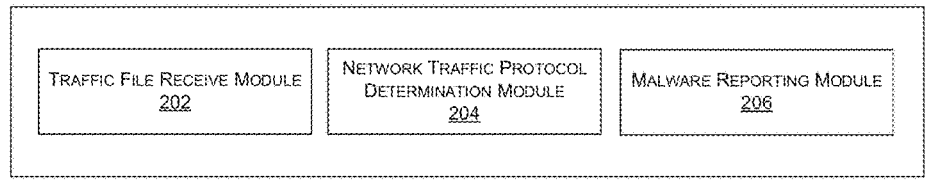
FIG. 2 illustrates exemplary functional modules of a traffic protocol based network security threat detection system in accordance with an embodiment of the present invention.

FIG. 2 illustrates exemplary functional modules 200 of a traffic protocol based network security threat detection system 200 in accordance with an embodiment of the present invention. FIG. 2 illustrates a high-level block diagram of a network security device that can be configured to detect network security threats based on protocols being used by such threats. In an example implementation, traffic protocol based network security threat detection system 200 can include a traffic file receive module 202, a network traffic protocol determination module 204, and a malware reporting module 206.

In an implementation, traffic file receive module 202 can be configured to receive a traffic file having one or more data packets that have been captured from network traffic and/or from an existing network security device/system and/or from a traffic generator. In an aspect, network traffic can include any or a combination of HTTP traffic, IRC traffic, and unclassified application traffic. Those skilled in the art will appreciate that format, size, content, purpose, direction, or any other attributes/parameters of such data packets/traffic file are non-limiting, and therefore the traffic file can be configured in any defined manner. According to one embodiment, a traffic file can be configured in a database/repository, and can be created so as to store one or more data packets that are exchanged between a client device and a server or visa-versa. In another aspect, information characterizing one or more of the traffic flows may be stored as a traffic file in a memory, wherein the traffic file may be represented as a string which includes a global header followed by one or more frames each having an associated frame header.

Those skilled in the art will appreciate that a traffic file is only an exemplary means of storing captured network traffic and any other format/mode of receiving network traffic is completely within the scope of the present disclosure. For instance, various methods and formats may be used for logging data derived from the network traffic, wherein, in some embodiments, the log may include a database that may be used to contain records, where each record can include the traffic file itself (such as a .cap, .pcap file, etc.) and all the relevant data (such as the speaker recognition template) as well as additional data derived and/or extracted from the traffic itself so that the record can be easily searched. In some embodiments, a less structured approach may be used, with multiple files or objects associated by a naming scheme or other methods of organization. Those skilled in the art will be aware of various other ways of organizing information associated with captured network traffic to facilitate searching, identifying and/or correlating relevant elements.

In an aspect, network traffic protocol determination module 204 can be configured to process the received traffic file and determine if any network protocol that is indicative of a network security threat exists in the traffic file. Module 204 can therefore be configured to determine one or more network protocol(s) being used by/in the received traffic file by, for instance, reading header of the received traffic file without violating integrity of communication, and assess whether the determined one or more network protocol(s) are indicative of any network security threat. Module 204 can further be configured to determine network protocol(s) that form part of the received traffic file by processing only a part of the traffic file as the network protocol information is included in the header of the traffic files itself. In an aspect, when the network protocol information is encrypted, module 204 can be configured to decode the header information to retrieve and process the network protocol information. In another aspect, network traffic protocols that form a part of a traffic file can be matched against a defined protocol pattern such as a regular expression pattern to confirm if the network traffic protocols match the defined one or more protocol patterns and are therefore indicative of the existence of a network security threat.

In an aspect of the present disclosure, system 200 can be configured to maintain a list of network protocols that are indicative of one or more network security threats such as a Botnet or an APT, based on which network traffic protocol of received traffic file can be processed to confirm if the network traffic protocol is indicative of one or more network security threats. Such a list of network traffic protocols can be stored/maintained in a repository and updated at regular intervals or in real-time once new botnets and/or APTs are identified. In an implementation, system 200 can be configured to retrieve a list of network traffic protocols that are indicative of network security threats from an antivirus lab or from a cloud based server, wherein the antivirus lab can be configured to collect the list of suspicious network traffic protocols from one or more anti-virus systems. In an aspect, the antivirus lab can also add one or more network traffic protocols whenever the antivirus lab detects/observes a network protocol used for circulating malicious content, used as a botnet communication protocol, used as a botnet C2 protocol and/or for conducting cyber attacks.

In an instance, network traffic protocols can include use of SMTP for sending SPAM, and use of HTTP, FTP, HTTPS and IRC (plaintext protocols) for C&C, wherein such network traffic protocols can be detected in a traffic file by examining say the header of the file, which can indicate the protocol through information contained in keywords such as GET, POST, and HEAD, wherein along with the network protocol, port information can also be determined. For instance, based on analysis of the Sasfis botnet, it has been observed that Sasfis bots communicate with the botnet C&C server using HTTP on TCP port 80. The URL of the server is hard coded into the bot, with the DNS lookup being done through the infected host's assigned DNS servers. When the bot initially runs, it sends a GET request to the C&C server with several parameters to identify itself. In return it receives some commands to be executed. From that point onward the bot reconnects to the server at timed intervals to check for further instructions.

Another known botnet is the Andromeda botnet. The Andromeda botnet typically attempts to connect to one or more of the following redacted URLs:

http://be{Removed}.su/alter.php
http://planp{Removed}.com/login.php
http://dn{Removed}.su/billing.php
http://bizw{Removed}.net/filling.php
http://xdq{Removed}.ru/in.php
http://a{Removed}m0rph.su/in.php
http://b{Removed}uehky.n1/in.php
http://yg{Removed}het.in/in.php In an aspect, malware reporting module 206 can be configured to report network security threat details if it is confirmed that the traffic file comprises one or more network protocols relating to at least one network security threat. Module 206 can therefore be configured to, once it is determined that the received traffic file includes at least one network traffic protocol that is indicative of at least one network security threat, flag the traffic file and/or content therein, extract details of the network security threat such as Botnet/APT in context, and report the details to say an IPS/IDS so that action on the traffic file and data packets contained therein can be taken. In case the traffic file does not include any network protocol that is indicative of a potential network attack/threat, data packets in the file can be allowed to pass through. In case the determined network traffic protocol is first deemed to be indicative of a network security threat, and is then later confirmed as a false positive, data packets in the traffic file can be allowed to pass through.

In an example implementation, system 200 can be configured to detect different types of security threats, including but not limited to Botnet/Advance Persistent Threat (APT), grayware/spyware/malware/bitcoin miner based threat, Remote Access Tool (RAT) based threats and other network attacks. System 200 can also be configured to detect malicious traffic between a BOTNET/APT and a C&C server, and can further be configured to work with any existing security device/system such as sandbox-like system, and IPS/Webfilter-like system.

Figure 3:
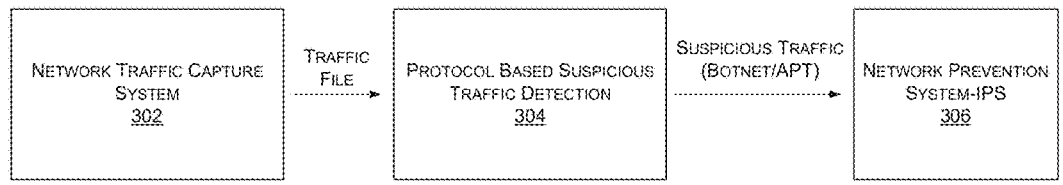
FIG. 3 illustrates an exemplary block diagram 300 of a traffic protocol based network security threat detection system in accordance with an embodiment of the present invention.

FIG. 3 illustrates an exemplary block diagram 300 of a traffic protocol based network security threat detection system in accordance with an embodiment of the present invention. As shown, the system can include a means 302 to capture and store network traffic having one or more data packets in the form of say a traffic file or any other configuration data structure format so that the data packets can be evaluated to confirm if they include characteristics (e.g., use of a particular protocol, interaction with a particular domain, etc.).

In an aspect, the traffic file having one or more data packets being transmitted from client device to server or visa-versa can be processed at block 304 in order to detect one or more network traffic protocols being used by the data packets, and confirm if the protocols are indicative of a network security threat, wherein if it is confirmed that at least one protocol is indicative of at least one network security threat such as Botnet/APT, at block 306, details of the network security threat can be reported to an IPS so that a suitable/defined action can be taken on subsequently observed traffic having characteristics similar to those identified. In an aspect, in case a portion of the traffic file that contains the network traffic protocol information is encrypted (say using TLS), block 304 can decode that part of the traffic file to detect the network protocol that is indicative of a network security threat based on a detection rule. According to one embodiment, the detection rule can be configured to match the at least one part of the received traffic file with a pattern to detect the network protocol, wherein the pattern can be selected from a set comprising regular expression based pattern, string match based pattern, and script language implemented pattern.

FIG. 4 illustrates exemplary stream content processing that may be employed to detect a botnet and/or an APT in accordance with an embodiment of the present invention. The present illustration is used to detect BOT NAME "Andromeda" with FILE MD5: b9672809d22f975a735209dd4fe142a2. Analysis of the traffic file/string indicates that post data is encrypted by base64 and RC4, with below representation showing the decoded POST data:

id:102{REMOVED}358|bid:169{REMOVED}24|bv:518|sv:128|pa:0|la:16{REMOVED}687|ar:1

The string below shows a regular expression in the form a detection pattern that can be used to detect the above-mentioned network traffic protocol information:

^id:\d+|bid:\d+|bv:\d+|sv:\d+|pa:\d+|la:\d+|ar:\d+$

In order to detect this Botnet protocol, a detection rule can be utilized by a network security device that is configured to decode POST data and match the pattern with a decoded string, as shown below in redacted form:

```
#       botnet_scanner-d          2-V         test/
   Andromeda_out.12647.Stream00.pcap
[+] Scanning file test/Andromeda_out.12647.Stream00.
   pcap . . .
[+] >> {test/Andromeda_out.12647.Stream00.pcap} found
   botnet [ACTIVE.Andromeda, Andromeda]
[+]====BOTNET: Andromeda, SRC: {REMOVED}:1036,
   DST: {REMOVED}:80
[+]====BOTNET:     ACTIVE.Andromeda,         SRC:
   {REMOVED}:80, DST: {REMOVED}:1036
Total scan 1 file(s)
Found 1 botnet(s) in 1 pcap file(s)!
```

FIGS. 5A and 5B illustrate additional examples of stream content processing of network traffic to detect a botnet and/or an APT in accordance with an embodiment of the present invention. FIG. 5A shows a traffic file having BOT NAME: Dofoil with FILE MD5: aa935ccea467884eb31714f3255287bd, wherein FIG. 5B represents the decoded plain text string. In an aspect, a regex pattern "^cmd=getload" can be configured to detect the Botnet based on the decoded plain text string. Alternatively, a new rule can also be created to detect the Dofoil network traffic protocol, wherein the below representation shows the test result of such a detection engine:

```
#       botnet_scanner     -d      2-V         test/
   DofoilV2.out.44125.Stream01.pcap
[+] Scanning file test/DofoilV2.out.44125.Stream01.
   pcap . . .
[+] ==== SPECIAL LOG:
CLEAN.cnc:::POST:::{REMOVED}/ads/:::{RE-
   MOVED}:::80:::DofoilV2
[+] << {test/DofoilV2.out.44125.Stream01.pcap} found
   botnet [DofoilV2]
[+] ==== BOTNET: DofoilV2, SRC: {REMOVED}:1042,
   DST: {REMOVED}: 80
Total scan 1 file(s)
Found 1 botnet(s) in 1 pcap file(s)!
```

In an aspect of the present disclosure, the system can be configured to capture and/or receive target samples of the network traffic such that if the system finds any protocols associated with Botnets/APTs in the traffic file, it notifies a security engine and reports the Botnet/APT name and associated CnC server. Furthermore, if the system detects an indication of a network security threat, it can push the information to a monitor system for Anti-virus engines or can may submit the CnC server information to an IPS engine to block the dangerous traffic or submit the URL to a webfilter component to intercept the URL access. When IPS/Webfilter engine receive the CnC information, they can stop the malicious traffic and prevent further communication between the client devices and the remote CnC server.

Figure 6:
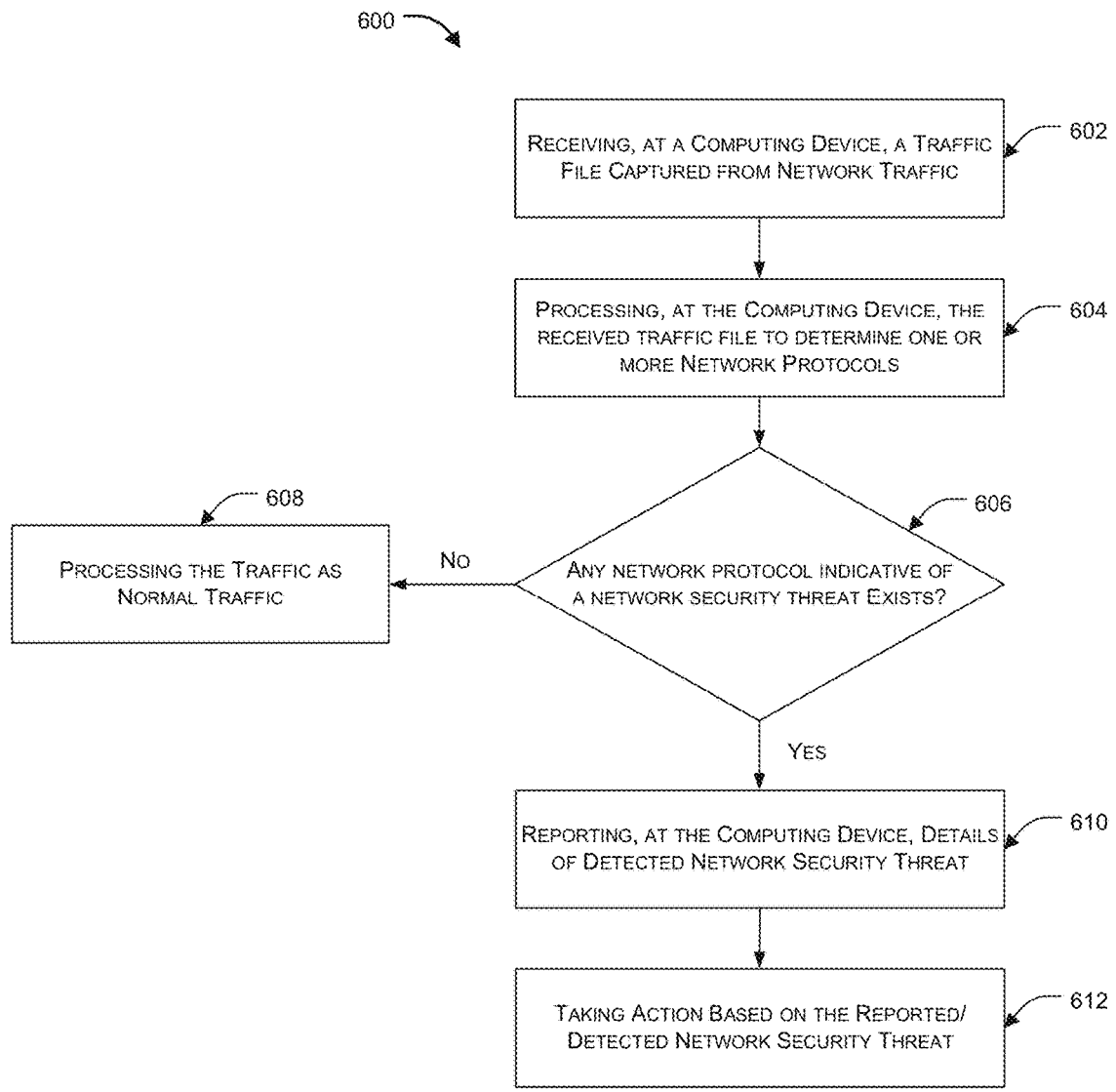
FIG. 6 is a flow diagram illustrating traffic protocol based detection processing of botnets and/or APTs in accordance with an embodiment of the present invention.

FIG. 6 is a flow diagram 600 illustrating traffic protocol based detection processing of botnets and/or APTs in accordance with an embodiment of the present invention. At step 602, a computing device such as a network security device can receive a traffic file containing traffic that has been previously captured and stored within a private network. At step 604, the received traffic file can be processed to determine one or more network traffic protocols that form part of the traffic file. At step 606, it is checked if any of the network traffic protocols are indicative of at least one network security threat, which if affirmative, at step 610, enables the network security device to report details of the detected network security threat and action being taken on the traffic file and/or data packets contained therein at step 612. On the other hand, when e the network traffic protocols are not indicative of any network security threat, at step 608, the traffic file and packets therein can be processed as normal.

Figure 7:
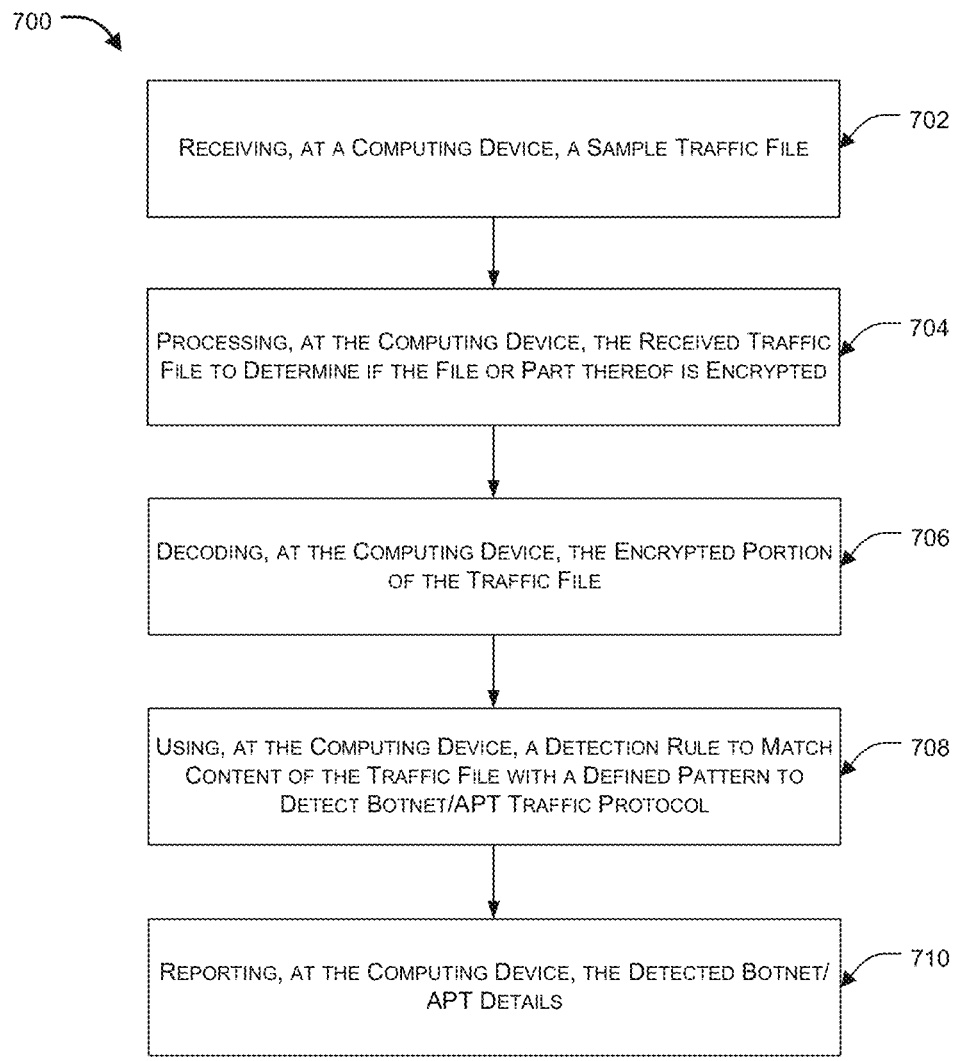
FIG. 7 is a flow diagram illustrating traffic protocol based detection of botnets and/or APTs in accordance with an alternative embodiment of the present invention.

FIG. 7 is a flow diagram 700 illustrating traffic protocol based detection of botnets and/or APTs in accordance with an alternative embodiment of the present invention. At step 702, a computing device such as a network security device can receive a traffic file that is captured from network traffic. At step 704, the received traffic file can be processed to determine if the file or a defined part thereof (such as the header part) is encrypted. At step 706, encrypted portion of the traffic file can be decoded and at step 708, a detection rule can be used to match content of the traffic file with a defined pattern to detect Botnet/APT traffic protocol. At step 710, details of the detected Botnet/APT can be reported.

Figure 8:
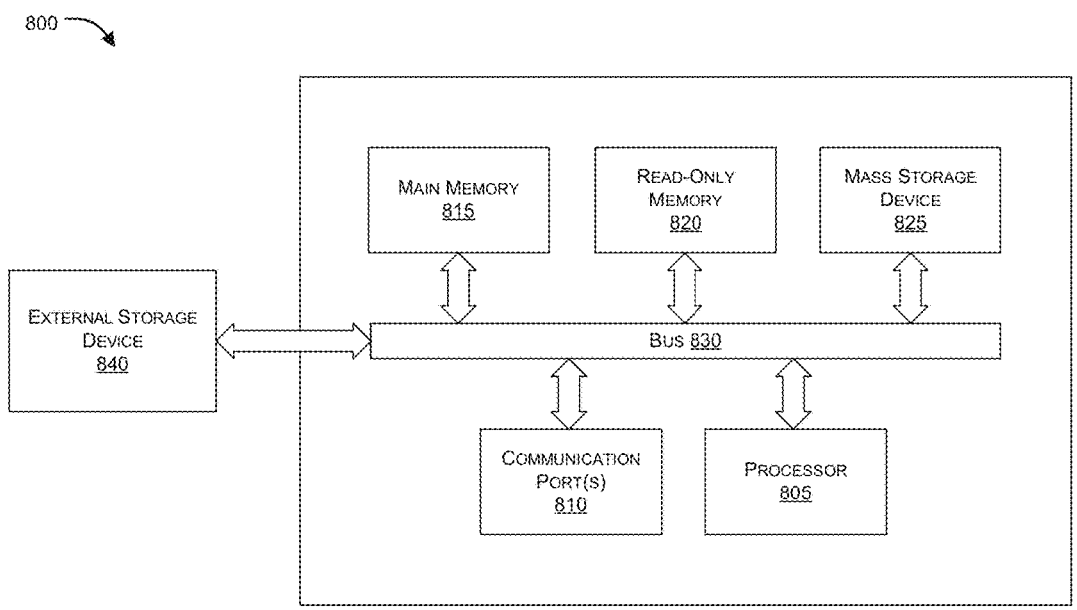
FIG. 8 is an exemplary computer system in which or with which embodiments of the present invention may be utilized

FIG. 8 is an exemplary computer system 800 with which embodiments of the present disclosure may be utilized. Computer system 800 may represent or form a part of a network appliance, a network traffic capture system, a network monitor, a network security device, a server or a client workstation. Embodiments of the present disclosure include various steps, which have been described in detail above. A variety of these steps may be performed by hardware components or may be tangibly embodied on a computer-readable storage medium in the form of machine-executable instructions, which may be used to cause a general-purpose or special-purpose processor programmed with instructions to perform these steps. Alternatively, the steps may be performed by a combination of hardware, software, and/or firmware.

As shown, computer system 800 includes a bus 830, a processor 805, communication port 810, a main memory 815, a removable storage media 840, a read only memory 820 and a mass storage 825. A person skilled in the art will appreciate that computer system 800 may include more than one processor and communication ports.

Examples of processor 805 include, but are not limited to, an Intel® Itanium® or Itanium 2 processor(s), or AMD® Opteron® or Athlon MP® processor(s), Motorola® lines of processors, FortiSOC™ system on a chip processors or other future processors.

Communication port 810 can be any of an RS-232 port for use with a modem based dialup connection, a 10/100 Ethernet port, a Gigabit or 10 Gigabit port using copper or fiber, a serial port, a parallel port, or other existing or future ports. Communication port 810 may be chosen depending on a network, such a Local Area Network (LAN), Wide Area Network (WAN), or any network to which computer system 800 connects.

Memory 815 can be Random Access Memory (RAM), or any other dynamic storage device commonly known in the art. Read only memory 820 can be any static storage device(s) such as, but not limited to, a Programmable Read Only Memory (PROM) chips for storing static information such as start-up or BIOS instructions for processor 805.

Mass storage 825 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), such as those available from Seagate (e.g., the Seagate Barracuda 7200 family) or Hitachi (e.g., the Hitachi Deskstar 7K1000), one or more optical discs, Redundant Array of Independent Disks (RAID) storage, such as an array of disks (e.g., SATA arrays), available from various vendors including Dot Hill Systems Corp., LaCie, Nexsan Technologies, Inc. and Enhance Technology, Inc.

Bus 830 communicatively couples processor(s) 805 with the other memory, storage and communication blocks. Bus 830 can be, such as a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 805 to system memory.

Optionally, operator and administrative interfaces, such as a display, keyboard, and a cursor control device, may also be coupled to bus 830 to support direct operator interaction with computer system 800. Other operator and administrative interfaces can be provided through network connections connected through communication port 810.

Removable storage media 840 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM).

Components described above are meant only to exemplify various possibilities. In no way should the aforementioned exemplary computer system limit the scope of the present disclosure.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of this document terms "coupled to" and "coupled with" are also used euphemistically to mean "communicatively coupled with" over a network, where two or more devices are able to exchange data with each other over the network, possibly via one or more intermediary device.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc. The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

While embodiments of the present disclosure have been illustrated and described, it will be clear that the disclosure is not limited to these embodiments only. Numerous modifications, changes, variations, substitutions, and equivalents will be apparent to those skilled in the art, without departing from the spirit and scope of the disclosure, as described in the claims.

What is claimed is:

1. A network security device comprising:
one or more processors; and
a non-transitory storage device having embodied therein instructions representing:
   a traffic file receive module, which when executed by the one or more processors receives a traffic file containing therein network traffic of a private network that has been captured and stored;
   a network traffic protocol determination module, which when executed by the one or more processors avoids affecting network traffic performance within the private network by performing post processing of the received traffic file, including:
      determining whether the network traffic relates to a network protocol that is potentially indicative of existence of a network security threat within the private network; and
      when said determining is affirmative, detecting the existence of the network security threat by evaluating the received traffic file against traffic patterns associated with existence of one or more of a plurality of known network security threats within the private network, wherein the traffic patterns discover communication between a botnet or an Advanced Persistent Threat (APT) and a command and control server and wherein the traffic patterns include:
         a first detection rule that (i) performs decryption of encrypted data contained within a Hypertext Transfer Protocol (HTTP) POST request to produce plaintext data and (ii) compares the plaintext data to a first detection pattern; and
         a second detection rule that (i) performs decryption of an encrypted payload of a dofoil network traffic protocol stream to produce a plaintext result and (ii) compares the plaintext result to a second detection pattern; and
   a malware reporting module, which when executed by the one or more processors reports details regarding the network security threat of the plurality of known network security threats when the network traffic protocol determination module determines existence of the network security threat within the private network.

2. The network security device of claim 1, wherein the network security threat comprises a client system within the private network that has been infected with a malicious bot associated with a known botnet or an Advanced Persistent Threat (APT), and wherein the details regarding the network security threat include one or a combination of a name of the known botnet, a name of the APT name, information regarding a protocol used to communicate between the client system and a command and control server associated with the known botnet or the APT.

3. The network security device of claim 2, wherein the malware reporting module further reports the network security threat to an Intrusion Protection System (IPS) protecting the private network.

4. The network security device of claim 2, wherein the malware reporting module further directs an Intrusion Protection System (IPS) protecting the private network to block traffic to and from the client system or submit a uniform resource locator (URL) associated with the command and control server to a web-filter to intercept access to the URL.

5. The network security device of claim 1, wherein the network security threat comprises any or a combination of a grayware, spyware or malware based threat, a bitcoin miner based threat or a Remote Access Tool (RAT) based threat.

6. The network security device of claim 1, wherein the first detection pattern and the second detection pattern are selected from a set comprising regular expression based patterns, string match based patterns, and script language implemented patterns.

7. The network security device of claim 1, wherein the network traffic comprises any or a combination of Hypertext Transfer Protocol (HTTP) traffic, Internet Relay Chat (IRC) traffic, and unclassified application traffic.

8. A method comprising:
receiving, at a network security device protecting a private network, a traffic file containing therein network traffic associated with the private network that has been captured and stored;
avoiding affecting network traffic performance within the private network by performing post processing, by the network security device, of the received traffic file, including:
determining whether the network traffic relates to a network protocol that is potentially indicative of existence of a network security threat within the private network; and
when said determining is affirmative, detecting the existence of the network security threat by evaluating the received traffic file against traffic patterns associated with existence of one or more of a plurality of known network security threats within the private network, wherein the traffic patterns discover communication between a botnet or an Advanced Persistent Threat (APT) and a command and control server and wherein the traffic patterns include:
a first detection rule that (i) performs decryption of encrypted data contained within a Hypertext Transfer Protocol (HTTP) POST request to produce plaintext data and (ii) compares the plaintext data to a first detection pattern; and
a second detection rule that (i) performs decryption of an encrypted payload of a dofoil network traffic protocol stream to produce a plaintext result and (ii) compares the plaintext result to a second detection pattern; and
reporting, by the network security device, details regarding the network security threat when existence of the network security threat is detected.

9. The method of claim 8, wherein the network security threat comprises a client system within the private network that has been infected with a malicious bot associated with a known botnet or an Advanced Persistent Threat (APT), and wherein the details regarding the network security threat include one or a combination of a name of the known botnet, a name of the APT name, information regarding a protocol used to communicate between the client system and a command and control server associated with the known botnet or the APT.

10. The method of claim 8, wherein said reporting comprises informing, by the network security device, an Intrusion Protection System (IPS) protecting the private network regarding the network security threat.

11. The method of claim 9, further comprising directing, by the network security device, the IPS to block traffic to and from the client system or submit a uniform resource locator (URL) associated with the command and control server to a web-filter to intercept access to the URL.

12. The method of claim 8, wherein the network security threat comprises any or a combination of a grayware, spyware or malware based threat, a bitcoin miner based threat or a Remote Access Tool (RAT) based threat.

13. The method of claim 8, wherein the first detection pattern and the second detection pattern are selected from a set comprising regular expression based patterns, string match based patterns, and script language implemented patterns.

14. A non-transitory computer-readable storage medium embodying a set of instructions, which when executed by one or more processors of a network security device protecting a private network, causes the one or more processors to perform a method comprising:
receiving a traffic file containing therein network traffic associated with the private network that has been captured and stored;
avoiding affecting network traffic performance within the private network by performing post processing of the received traffic file, including:
determining whether the network traffic relates to a network protocol that is potentially indicative of existence of a network security threat within the private network; and
when said determining is affirmative, detecting the existence of the network security threat by evaluating the received traffic file against traffic patterns associated with existence of one or more of a plurality of known network security threats within the private network, wherein the traffic patterns discover communication between a botnet or an Advanced Persistent Threat (APT) and a command and control server and wherein the traffic patterns include:
a first detection rule that (i) performs decryption of encrypted data contained within a Hypertext Transfer Protocol (HTTP) POST request to produce plaintext data and (ii) compares the plaintext data to a first detection pattern; and
a second detection rule that (i) performs decryption of an encrypted payload of a dofoil network traffic protocol stream to produce a plaintext result and (ii) compares the plaintext result to a second detection pattern; and
reporting details regarding the network security threat when existence of the network security threat is detected.

15. The non-transitory computer-readable storage medium of claim 14, wherein the network security threat comprises a client system within the private network that has been infected with a malicious bot associated with a known botnet or an Advanced Persistent Threat (APT), and wherein the details regarding the network security threat include one or a combination of a name of the known botnet, a name of the APT name, information regarding a protocol used to communicate between the client system and a command and control server associated with the known botnet or the APT.

16. The non-transitory computer-readable storage medium of claim 14, wherein said reporting comprises informing an Intrusion Protection System (IPS) protecting the private network regarding the network security threat.

17. The non-transitory computer-readable storage medium of claim 16, further comprising directing the IPS to block traffic to and from the client system or submit a uniform resource locator (URL) associated with the command and control server to a web-filter to intercept access to the URL.

18. The non-transitory computer-readable storage medium of claim 14, wherein the network security threat comprises any or a combination of a grayware, spyware or malware based threat, a bitcoin miner based threat or a Remote Access Tool (RAT) based threat.

19. The non-transitory computer-readable storage medium of claim 14, wherein the first detection pattern and the second detection pattern are selected from a set comprising regular expression based patterns, string match based patterns, and script language implemented patterns.

\* \* \* \* \*